(12) United States Patent
Becker

(10) Patent No.: US 6,776,971 B1
(45) Date of Patent: Aug. 17, 2004

(54) VISIBLE LIGHT PH CHANGE FOR ACTIVATING POLYMERS AND OTHER PH DEPENDENT REACTANTS

(75) Inventor: Carol A. Becker, Solana Beach, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/060,420

(22) Filed: Jan. 29, 2002

Related U.S. Application Data

(62) Division of application No. 09/574,987, filed on May 12, 2000, which is a division of application No. 09/137,008, filed on Aug. 20, 1998, now Pat. No. 6,143,138.

(51) Int. Cl.$^7$ ................................................ B01J 19/08
(52) U.S. Cl. .................................................. 422/186.3
(58) Field of Search ...................................... 422/186.3

(56) References Cited

U.S. PATENT DOCUMENTS 4,916,169 A * 4/1990 Boardman et al. ............ 522/27

* cited by examiner

Primary Examiner—Steven VerSteeg
(74) Attorney, Agent, or Firm—Peter A. Lipovsky; Michael A. Kagan; Allan Y. Lee

(57) ABSTRACT

A method and apparatus for initiating a rapid and long-lasting pH change to a pH dependent polymer or other pH driven reactant is provided by a pH jump molecule in solution. Visible light is used to excite the pH jump molecule. The attendant pH change occurs rapidly (in nanoseconds) and can be maintained by continuous wave light or by an appropriately pulsed light. Heat resulting from the light activation is efficiently discharged by radiative decay through room temperature phosphorescence lifetimes existing on the order of milliseconds.

2 Claims, 5 Drawing Sheets

| REACTION | EXAMPLE | pK(S$_0$) | pK(S$_1$) | pK(T$_1$) | \|ΔpK\| |
|---|---|---|---|---|---|
| -CO$_2$H <--> -CO$_2^-$ +H$^+$ | 2-NAPHTHOIC ACID | 4.2 | 11.0 | 4.0 | 0.2 |
| -OH <--> -O$^-$ +H$^+$ | 2-NAPHTHOL | 9.5 | 2.8 | 8.1 | 1.4 |
| -NH$_3^+$ <--> -NH$_2$ +H$^+$ | 2-NAPHTHYLAMINE | 4.1 | -2.0 | 3.3 | 0.8 |
| -NO$_2$H <--> -NO$_2^-$ +H$^+$ | NITROBENZENE | -11.3 | 2.3 | -9.3 | 2.0 |
| Ar$_2$NH$^+$ <--> Ar$_2$N +H$^+$ | ACRIDINE | 5.5 | 10.6 | 5.6 | 0.1 |

ΔpK = pK(T$_1$) − pK(S$_0$)

VISIBLE LIGHT PH CHANGE FOR ACTIVATING POLYMERS AND OTHER PH DEPENDENT REACTANTS

CROSS-REFERENCE TO RELATED APPLICATIONS

This application is a division of U.S. patent application Ser. No. 09/574,987 filed May 12, 2000 which in turn is a division of U.S. patent application Ser. No. 09/137,008, filed Aug. 20, 1998 and issued as U.S. Pat. No. 6,143,138 on Nov. 7, 2000.

BACKGROUND OF THE INVENTION

This invention relates generally to a method and apparatus for producing a pH change in a solution. More specifically, the invention relates to producing a pH change in a solution by irradiating the solution with visible light. With greater specificity, but without limitation thereto, the invention relates to using light to alter the pH of a solution to thereby cause an expansion and/or contraction of a pH dependent polymer immersed in the solution.

There exist a number of natural and synthetic fibers and gels that are expandable and contractible in volume when activated by an environmental change, such as exposure to a change in solvent composition, temperature, pH, electric field or photo irradiation, for example. As a commercially exploitable technology, the fibers and gels have applications in many fields, such as, for example, use in sensors, switches, motors, pumps, non-metallic operations and use in the medical and robotic fields where it is envisioned that these materials will be able to carry out the function of human muscle tissue.

The work of W. Kuhn and B. Hargitay as described in "Muskelahnliche Arbeitsleistung Kunstlicher Hochpolymerer Stoffe", Z. Elektrochemie 1951, 55(6), 490–502, incorporated by reference herein is one example of a synthesized polymer material capable of expansion and/or contraction. When the Kuhn and Hargitay polyacrylamide fiber, known as polyacrylic acid-polyvinyl alcohol (PAA-PVA), is placed within a solution of appropriately increasing pH, a 10% increase in fiber length is claimed to be observed.

Similarly, the work of T. Tanaka, D. Fillmore, S-T. Sun, I. Nishio, G. Swislow, and A. Shah described in the article "Phase Transitions in Ionic Gels" Phys. Rev. Lett. 1980, 45(20), 1636–1639, incorporated by reference herein discloses an observed 400% volume collapse for a polyacrylamide gel disposed in a 50% acetone-water solvent mixture in which the pH of the solvent is lowered at constant temperature and solvent composition.

The work of Kuhn and Hargitay as well as Tanaka and Fillmore et al use a typical approach to changing the pH of a solution. In this approach, the pH is changed by manually dripping an acid or base into the solution. This technique, known as the "acid drip" method, relies upon the rate of the diffusion of hydrogen ions to a polymer site and is considered undesirably slow for certain polymer applications, such as use in synthetic muscles.

Besides the pH activation method of Kuhn and Hargitay and Tanaka and Fillmore et al, there exist electrical polymer activation schemes in which p-electron conjugated conducting polymers and electronically doped non-conducting polymers are electrically activated (expanded and contracted). An example of this activation method has been characterized by Shahinpoor et al as described in the article of D. J. Segalman, W. R. Witkowski, D. B. Adolf, and M. Shahinpoor titled: "Theory and Application of Electrically Controlled Polymeric Gels", Smart Materials and Structures, Vol. 1 (no. 1), M. V. Gandhi and B. S. Thompson (Eds.), London: Chapman and Hall, 1992, 95–100. Like the pH activation method described above, the Shahinpoor et al method depends on the slow diffusion of ions to the active site of a polymer and therefore is also considered too slow for certain polymer applications such as use in synthetic muscles.

In addition to the activation approaches described above, there exist optical activation methods for causing volume changes in polymer fibers and gels. Noteworthy of these is the work of M. Irie and D. Kunwatchakun described in "Photoresponsive Polymers. 8. Reversible Photostimulated Dilation of Polyacrylamide Gels Having Triphenylmethane Leuco Derivatives", Macromolecules 1986, 19(10), 2476–2480. The Irie-Kunwatchakun studies were among the earliest on photoinduced volume changes in polymer gels. Photosensitive molecules, such as leucocyanide and leucohydroxide, were incorporated directly into a polymer's network. Irradiation with UV light produced a 2.2-fold reversible dimension change, but no significant volume change (phase transition) took place in the polymer studied, as the UV light-induced pH change was far from the pH null point of the polymer gel. Thus the magnitude of the dimension change was not optimized for certain applications such as robotics.

In the work of researchers Mamada and Tanaka as described in A. Mamada, T. Tanaka, D. Kungwatchakun, and M. Irie in "Photoinduced Phase Transition of Gels", Macromolecules 1990, 23, 1517–1519 and as described in A. Mamnada, T. Tanaka, D. Kungwatchakun, and M. Irie in U.S. Pat. No. 5,242,491 titled: "Photo-induced Reversible, Discontinuous Volume Changes in Gels" and issued Sep. 7, 1993, photoinduced phase transitions in gels were observed. The copolymer used was that of Irie-Kunwatchakun described above. At a given temperature, the polymer gel discontinuously swelled in response to UV irradiation and shrank when the UV light was removed. It is hypothesized that this swelling is due to dissociation into ion pairs, thereby increasing internal osmotic pressure within the gel. The shrinking process of this method is governed by ion diffusion and recombination, making the speed of the reverse process impossible to control, thereby hindering its usefulness in many polymer actuator applications.

In either of the UV studies described above, the UV radiation can cause undesired ionization, photolysis and molecular ligation of a utilized polymer.

Finally, in the work of A. Suzuki and T. Tanaka described in the article "Phase Transition in Polymer Gels Induced by Visible Light", Lett. Nature 1990, 346, 345–347, visible light was used to irradiate a gel containing a light-sensitive chromophore located in the backbone of an expandable and contractible copolymer. The chromophore absorbed the light and the light energy was then dissipated locally as heat by radiationless transitions, the result of which increased the "local" temperature of the polymer. Unlike the UV studies, the polymer expansion is a rapid process and is due to the direct heating of the polymer network by light. Yet the process of returning the polymer to its original size requires cooling, which becomes increasingly difficult as the temperature of the surrounding solution approaches the temperature of the polymer. This reverse process is too slow for many polymer uses such as in synthetic muscles.

Because many reactions are based on either acid or base catalyzations, including those of the polymers described above, researchers have investigated various approaches to promoting rapid pH changes. Such has been the case of Anthony Campillo et al as described in the article by A. J. Campillo, J. H. Clark, R. C. Hyer, S. L. Shapiro, K. R. Winn, and P. K. Woodbridge titled: "The Laser pH Jump", Proc. Intl. Conf. Lasers '78, Orlando, Fla., Dec. 11–15, 1978, Chem. Phys. Lett. 1979, 67(2), 218–222; the article by A. J. Campillo, J. H. Clark, S. L. Shapiro, K. R. Winn, and P. K. Woodbridge, titled: "Excited-State Protonation Kinetics of Coumarin 102", Chem. Phys. Lett. 1979, 67(2), 218–222; the article by J. H. Clark, S. L. Shapiro, A. J. Campillo, K. R. Winn, titled: "Picosecond Studies of Excited-State Protonation and Deprotonation Kinetics. The Laser pH Jump", J. Am. Chem. Soc. 1979, 101(3), 746–748; and U.S. Pat. No. 4,287,035 issued to John H. Clark, Anthony J. Campillo, Stanley L. Shapiro, and Kenneth R. Winn on Sep. 1, 1981.

The work of Campillo et al relies on excited-state proton transfer reactions to change the [H+] of a solution by several orders of magnitude. Campillo et al used a picosecond spectroscopy tool to directly measure excited-state deprotonation-protonation reaction rate constants. To promote a pH change, a UV laser with a pulse width of 20 picoseconds was used to excite 2-naphthol-6-sulfonate to a higher ($S_1$) electronic state. From the measured rate constants, Campillo et al determined that the excited-state $pK_a$ value was 1.9, as opposed to the ground-state value of 9.1. This 7-unit change in $pK_a$ corresponds to a 7-order of magnitude increase in the acid dissociation constant, $K_a$. Campillo's findings are consistent with earlier studies which show that excited-state $K_a$ values can differ from ground-state values by many orders of magnitude, see the disclosure of J. F. Ireland and P. A. H. Wyatt titled: "Acid-Base Properties of Electronically Excited States of Organic Molecules", Adv. Phys. Org. Chem. 1976, 12, 131–221.

Campillo et al claim that a major use of their technique is initiation of acid-base catalyzed ground-state reactions. For example, the reactants A and B are present in solution at pH 7. The ground state reaction, A+B→C, occurs only at pH 4. By exciting the Campillo et al "jump molecule", 2-naphthol-6-sulfonate, a subnanosecond jump from pH 7 to pH 4 can be achieved, thereby enabling the desired ground-state reaction. Referring to FIG. 1, a schematic state energy level diagram illustrates the path by which the "jump molecule" 2-naphthol-&sulfonate travels to produce the pH change described. The 2-naphthol-6-sulfonate is irradiated with LTV light and is excited from ground state $S_0$ to first excited singlet state $S_1$. Radiative decay (florescence) then occurs bringing the molecule back to its ground state.

A major drawback of the Campillo technique is the extremely short duration of the accompanying pH change, typically 10 nanoseconds. While Campillo proposes that the excited state duration, and hence pH change, could be prolonged through use of repetitious irradiation, such an irradiation would require a bombardment of photons on the order of a million times a second. An additional shortcoming of the Campillo technique, when utilized with expandable and contractible polymers such as those described above, is that the utilized UV radiation promotes undesirable polymer ionization, photolysis and other molecular ligation. Additionally, the extremely narrow illumination path (0.1 mm or 5D-6 cubic centimeters) provided by the utilized 266 nanometer laser is considered insufficient to effectively illuminate an expandable/contractible polymer to undergo an appreciable change in volume.

SUMMARY OF THE INVENTION

The invention provides a method and apparatus of rapidly changing the pH of a solution by way of a pH jump molecule that is activated by visible light. An application of the present invention is the ground-state reaction of changing the volume of an expandable and contractible polymer for simulated muscle applications as well as for other applications.

To permit these applications, it is desirable (1) to use a source of excitation energy that is not harmful to a utilized polymer; (2) to produce an in-situ pH change in which hydrogen ions become rapidly present at a polymer site; (3) to sustain the resultant pH change long enough and in a volume large enough for desired ground-state reactions to occur, for example, the fully reversible expansion and contraction of a polymer; and (4) to provide a mechanism for efficient dissipation of heat produced as a result of the source of excitation energy.

Candidate pH "jump molecules" considered suitable for providing sufficient polymer actuation (activation) should possess the following characteristics:

(1) the jump molecules should have long lifetimes at room temperature, e.g 10 milliseconds;
(2) the jump molecule acidity constants should be grossly different in ground and triplet states, e.g., 7 orders of magnitude;
(3) the resultant pH change should go through the midpoint (pH null point) of the utilized polymer; and
(4) either the non-protonated or the protonated form of the jump molecule should absorb in the visible region of the spectrum.

In accordance with the present invention, an apparatus and method incorporating these desirable features are disclosed. The invention includes a pH jump molecule that permits visible light excitation to provide a long lasting pH change to a pH dependent polymer or other pH driven reactant. The attendant pH change occurs rapidly (in nanoseconds) and will last for the excited state lifetime of the jump molecule. Further irradiation by either a continuous wave or appropriately pulsed laser can sustain the pH change indefinitely. The pH jump molecule is phosphorescence. That is, heat resulting from the light activation is efficiently discharged by radiative decay through room temperature phosphorescence lifetimes existing on the order of milliseconds. Thus an expandable and contractible polymer can be made to respond rapidly to a change in pH while the radiant heat-release mechanism of the invention allows the polymer to return to its initial configuration in a millisecond time frame, suitable for a variety of useful applications, including robotics.

Accordingly, it is an object of this invention to provide a method and apparatus for producing a rapid pH change in a solution.

A further object of this invention is to produce a rapid pH change in a solution that is useful in causing the expansion and/or contraction of a polymer.

Another object of this invention is to produce a rapid pH change in a solution that lasts long enough and is prevalent enough to be useful in causing the expansion and/or contraction of a polymer.

Still another object of this invention is to produce a rapid pH change in a solution that is useful in causing the expansion and/or contraction of a polymer while minimizing damage to the polymer.

Still yet another object of this invention is to produce a rapid pH change a solution by irradiating the solution with visible light.

Yet another object of this invention is to produce a pH change in a solution by irradiating the solution with visible light in which any heat produced by the light is rapidly dissipated.

DESCRIPTION OF THE PREFERRED EMBODIMENT

In the expandable and contractible polymer world, a term of art has evolved that describes the large and easily perceptible change in volume that occurs when such a polymer, whether it be a gel or a fiber, is exposed to a particular change in the pH of a solution in which the polymer is immersed. This term of art is known as a "phase transition", and describes the physical phenomenon that takes place when the polymer is exposed to a narrow change in pH that passes through what is know as the pH null point of the polymer.

Figure 2:
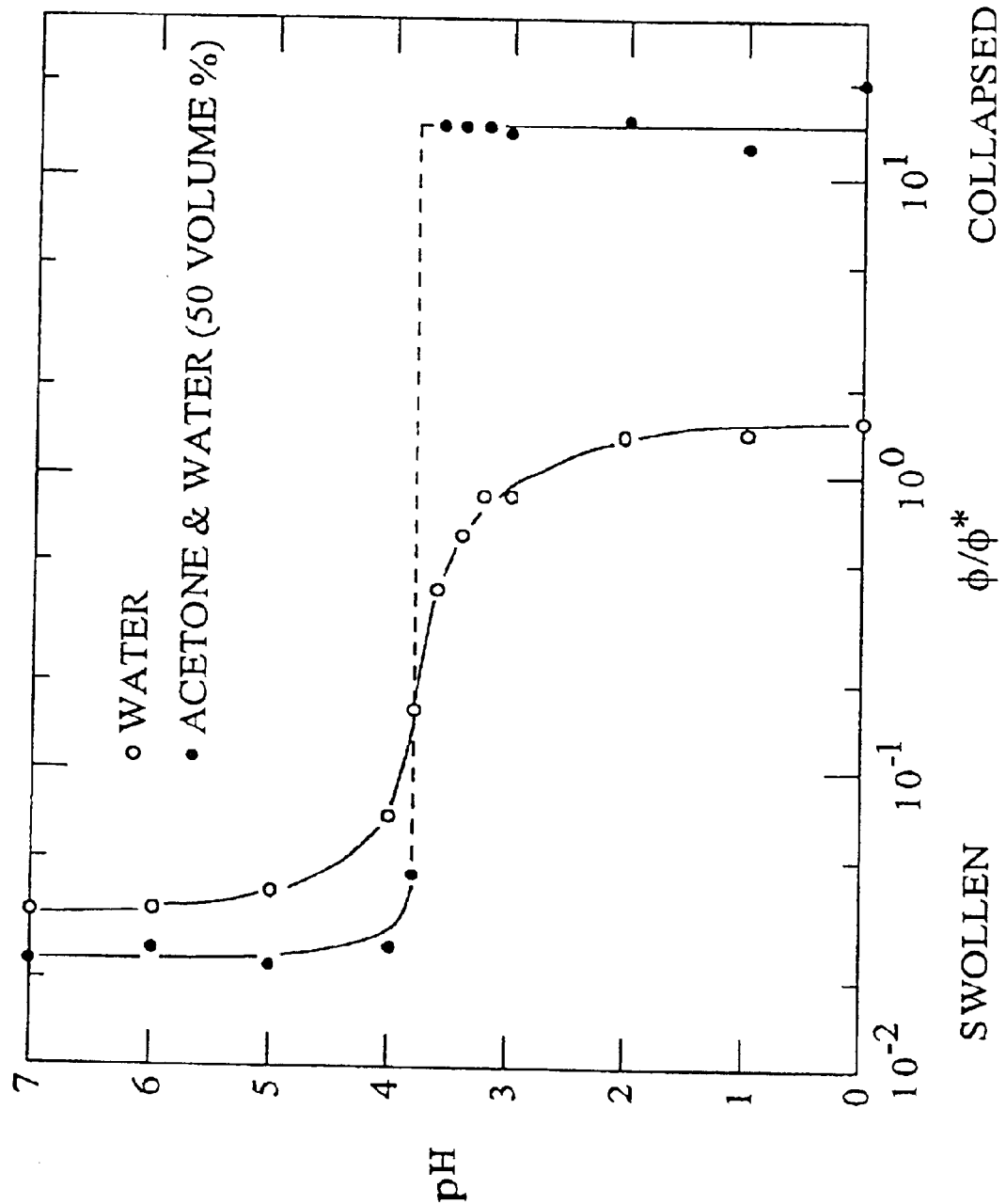
FIG. 2 is illustrates the pH expansion and contraction dependence of an exemplary polymer, in this case an acrylamide gel.

Referring to FIG. 2, there is shown a graphical depiction of such a phase transition. This illustration, taken from the 1980 Physical Review Letter of T. Tanaka and D. Fillmore et al referred to above, shows the response of a polymer network of an acrylamide gel that has been hydrologized in a 4% (volume) N,N,N,N-tetramethylenediamine (TEMED) solution. The quantity $\phi/\phi^*$ represents the swelling ratio which is the ratio of the final polymer network concentration to the initial polymer network concentration. The smooth curve is for gels immersed in water. The discontinuous curve is for gels in a 50% acetone-water mixture. In either case, as pH is increased, the gel swells; as the pH is decreased, the gel shrinks.

For the acetone-water mixture shown in FIG. 2, the sharp s-shaped curve is characteristic of a phase transition. This behavior is referred to as a phase transition because an enormous amount of polymer swelling-shrinking occurs within a very narrow range of pH values. Capitalizing on this phenomenon, the greatest leverage for polymer activation can be achieved by finding a polymer-polymer activation system that has a $PK_a$ at the midpoint of the pH curve (or what is otherwise referred to as the null point of the polymer). The closer that the ground state $pK_a$ of a candidate "jump molecule" is to the null point of a polymer, the greater will be the variability of polymer volume for a given quantity of excitation energy. By using such a jump molecule, a small change in pH to either side of the midpoint will expand or contract the polymer by the largest amount possible, optimizing polymer dimensional change for use in robotics or other applications.

The term pK is a shorthand indicating the strength of an acid ($pK_a$) and is defined as the $-\log_{10} K$ in which K is the characteristic equilibrium constant K, represented by:

$$K = [H^+][B]/[BH^+]$$

where $[H^+]$ is the hydrogen ion concentration and $[B]$ is the concentration of the conjugate base. When the amount of one of these constituents is varied, the others will adjust to keep K constant.

Figure 1:
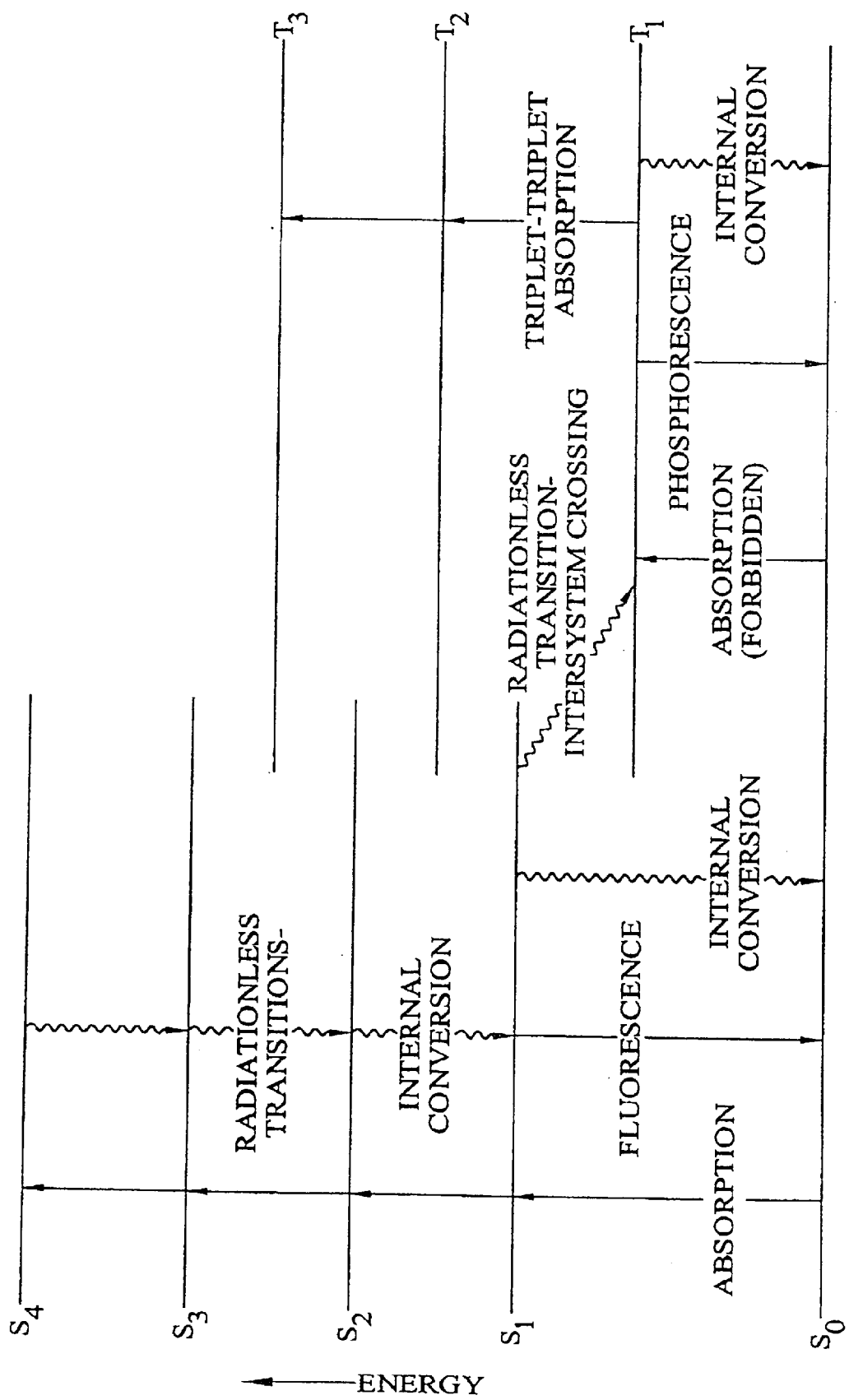
FIG. 1 is a schematic state energy level diagram.

During the course of scientific research, the inventor constructed kinetic equations for the 3-level system of FIG. 1. Referring again to FIG. 1, an ideal "jump molecule" will be excited from ground state energy level ($S_0$) to first excited singlet state energy level ($S_1$), and return to the ground state via triplet state energy level ($T_1$). The radiationless transition and radiative decay via phosphorescence will function as a "sink" for the molecules and because of their combined long lifetime, a prolonged molecule excited state will exist. The pH change produced by this excitation will last for the life of this excited state.

Repeated runs with many different candidate jump molecules predicted the requirements necessary to sustain a desired pH change:

(1) jump molecules should have long excited state lifetimes at room temperature, e.g., 10 milliseconds;

(2) jump molecule acidity constants must be grossly different in the triplet and ground states, e.g., 7 orders of magnitude;

(3) the resultant pH change should go through the midpoint (pH null point) of a utilized polymer; and (4) either the non-protonated or the protonated form of the jump molecule should absorb in the visible region of the spectrum.

A great many molecules with functional groups were eliminated based upon being disqualified by the above requirements.

For example, the phenones are considered undesirable because the lifetimes of the protonated and non-protonated forms are very different, providing a rapid excited state deactivation channel. An example of this is benzophenone, having an unprotonated lifetime of 100 milliseconds and a protonated lifetime of 62 nanoseconds.

Figure 3:
FIG. 3 describes $\Delta pK$ values for various families of molecules

In addition, a great many functional groups were eliminated based upon small $\Delta pK$ values, $\Delta pK$ in this instance being the difference between first triplet state pK value minus the ground state pK value ($pK(T_1)-pK(S_0)$), as can be seen in FIG. 3.

In Table 1, characteristics of the carbon acids are described. The carbon acids shown exhibited long excited-state lifetimes $\tau_p$ (p for phosphorescence), large $\Delta pK$ values, and have $\Delta pK$ values that pass through a desired polymer null point, however the excitation wavelength $\lambda_{00}$ necessary to initiate a pH change falls within the ultraviolet. In this table, "obs" means "observed" and "c" means "calculated".

TABLE 1

|  | $\tau_p$ (msec) | pK ($S_0$) | pK ($S_1$) | pK ($T_1$) | $\lambda_{00}$ (nm) |
| --- | --- | --- | --- | --- | --- |
| fluorene | 0.35 | 23.04 | −5.96 (c) | 7.54 (c) | 300 |
| 9-phenylflourene | obs | 18.6 | −10.7 (c) | 4.2 (c) | 305 |
| 9-cyanflourene | obs | 11.4 | −12.4 (c) | 5.0 (c) | 300 |

Through the process of elimination, several families of molecules satisfied the pH jump molecule requirements stated above. One of these are the polynuclear aromatic hydrocarbons (PAC's) which are bases.

Figure 4:
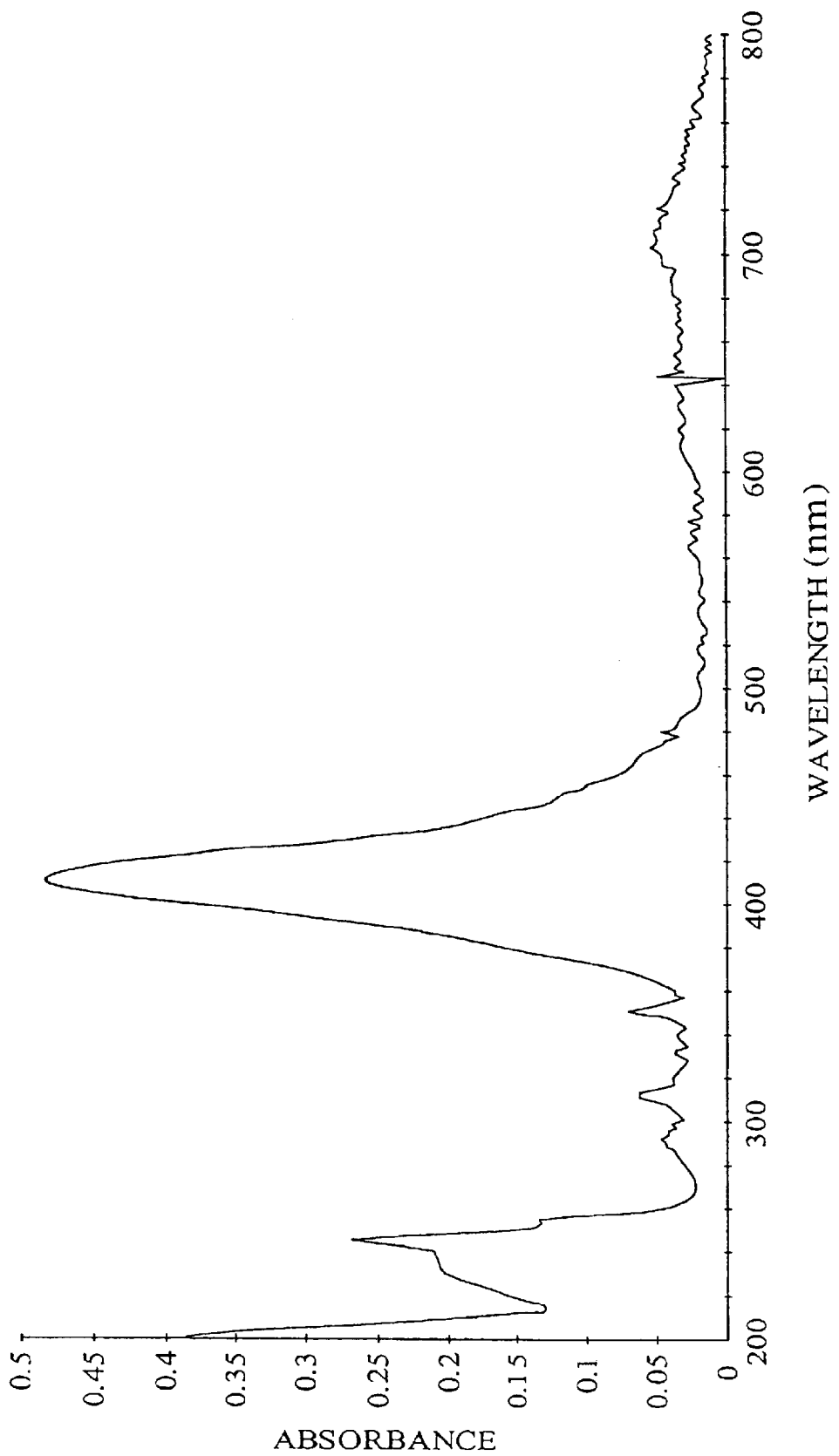
FIG. 4 illustrates the light absorbance of anthracene versus wavelength.

Of these, the PAC, anthracene, fits well with certain well established polymers. Referring to FIG. 4, the protonated form of this molecule is confirmed. In FIG. 4, an absorbance versus wavelength profile shows the zero-time spectrum for protonated anthracene. The peak at 424 nm is the only peak within the visible region of the spectrum which decreases with time, and is the signature of anthracene's protonated form. It is this peak that is used to activate the anthracene polymeric actuator with visible light.

Figure 5:
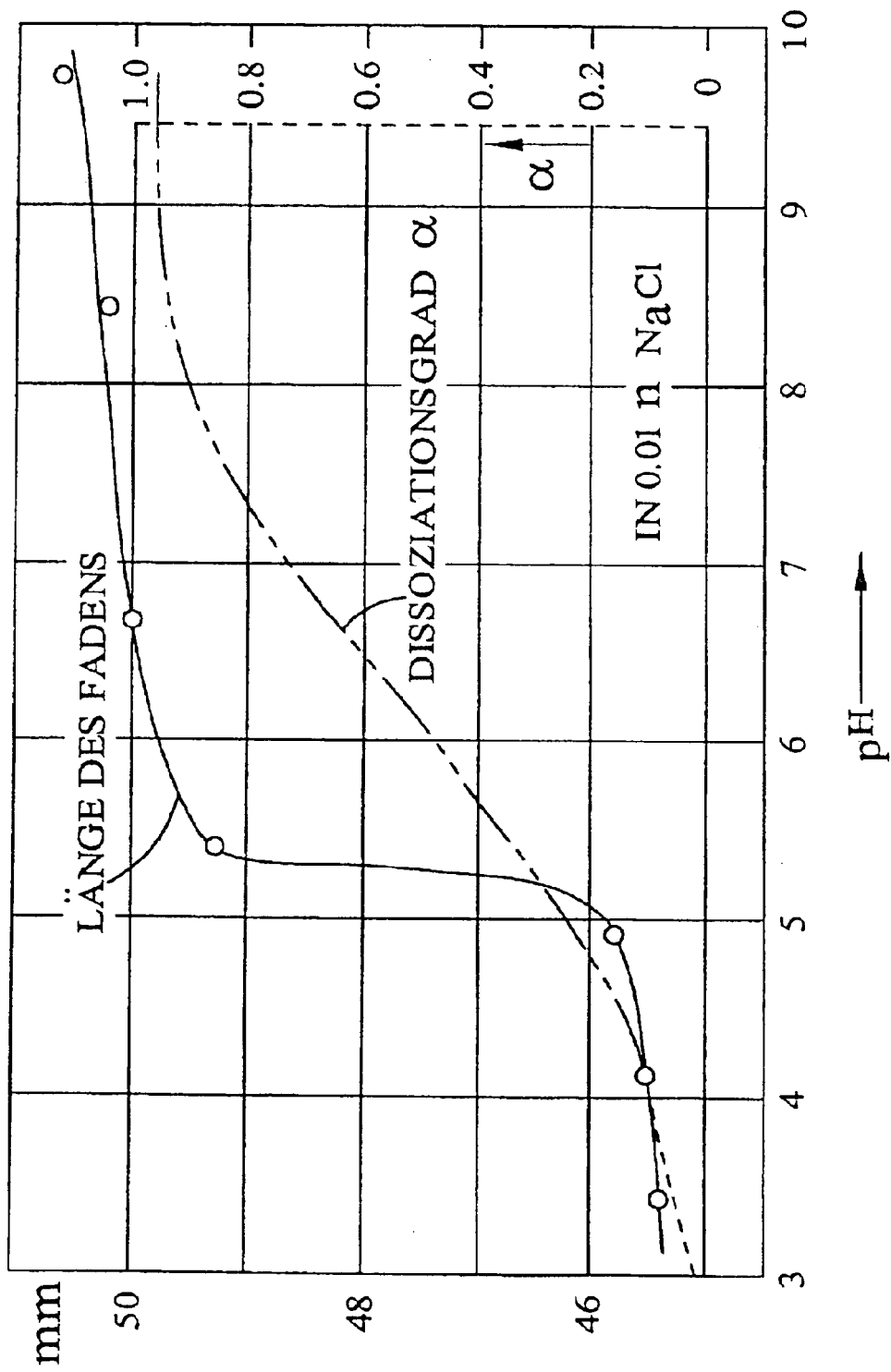
FIG. 5 illustrates the pH expansion and contraction dependence of another exemplary polymer, in this case a polyacrylic acid-polyvinylalcohol (PAA-PVA) fiber.

Referring to FIG. 5, the contractile-expansion characteristics of the Kuhn-Hargitay polyacrylic-acid-polyvinylalcohol (PAA-PVA) polymer are shown. The Kuhn-Hargitay polymer fiber undergoes a phase transition between pH levels of 5 and 5.5, having a pH null point of approximately 5.3, as shown by the "Lange des Fadens" or "Length of Fiber" solid line.

Referring now to Table 2, specifications for utilizing protonated anthracene in coordination with the polymer described by Kuhn-Hargitay referred to above are shown.

TABLE 2 pH change and species concentrations
BH+ only absorbing, pH = 5.0, 413.1 nm
BH+ <--> B + H+
Anthracene Jump Molecule

|  | Ground | Singlet | Triplet | Log (eps) | epsilon |
|---|---|---|---|---|---|
| pK's | 3.8 | 13.6 | 10.3 |  |  |
| Lifetimes nS (mS) |  | 10.0 | (10.0) |  |  |
| B | 9.7D-4 | 1.5D-21 | 3.0D-11 | 0.04 | 1 |
| BH+ | 6.4D-4 | 2.0D-11 | 2.0D-4 | 4.38 | 23988 |
| Initial Concentrations: |  | Final pH: |  |  |  |
| pH | 5.0 | 5.48 |  |  |  |
| [H+] | 1.0D-5 | 3.3D-6 |  |  |  |
| [B] | 9.8D-4 |  |  |  |  |
| [BH+] | 2.0D-4 | Watts | 4.2 | Photons/sec | 9.3D + 18 |
| Total B | 1.0D-3 | V cm3 | 1.0 | P/cm3-sec | 9.3D + 18 |

413.1 nm = Center Kr+ line: 406.7, 413.1, 415.4

By utilizing visible light, the protonated form $BH^+$ of anthracene is disassociated into its base (B) and hydrogen ion ($H^+$) constituents to prompt a pH change from 5 to 5.48. As can be seen, the $\Delta pK$ ($pK(T_1)-pK(S_0)$) of anthracene is 10.3-3.8, permitting such a large scale pH change. The calculation in Table 2 is based on a $pK(S_0)$ value for anthracene found in Mackor. E. L., Hofstra, A., and Van Der Waals, J. H., 1958, in an article entitled "The Basicity of Aromatic Hydrocarbons", Trans. Faraday Soc., vol. 54, 66.

For use with the referenced Kuhn-Hargitay polymer, the desired protonated form of anthracene is derived by dissolving enough anthracene in cyclohexane, as described in Table 2, so that the resulting concentration of non-protonatedanthracene is 9.8D-4 moles/liter when the pH is adjusted to 5.0 by the addition of sulfric acid ($H_2SO_4$). The mixture is then vigorously shaken in a separatory funnel, causing the anthracene to diffuse from the cyclohexane to the sulfuric acid to form a solution of protonated anthracene.

For the polymer-anthracene combination described, a BeamLok 2080 krypton ion laser was used to irradiate the polymer system at 413.1 nanometers and 4.2 watts. The one cubic centimeter irradiation volume is large enough to house a polymer of macroscopic dimensions as the jump molecule provides a pH change from 5.0 to 5.48. Because of the 10 millisecond prolonged excited state of the anthracene jump molecules, the continuous wave laser will permit constant pH elevation until the irradiation is cut-off, at which time the excited-state jump molecules will decay to the ground state and reassociate, causing a return to the original pH in a few milliseconds. Importantly, the heat created by the molecules absorbing the irradiated light is released as light of a longer wavelength. Full polymer reversibility, which is not hindered by the slow dissipation of heat, is therefore made possible for use in many polymer applications, including robotics.

Besides use of a continuous wave irradiation source, a pulsed laser having a repetition rate of 100 times a second at 42 millijoules will also suffice. This repetition rate will prompt a pulse every 10 milliseconds, permitting continuous pH elevation.

Referring now to Table 3, specifications for utilizing protonated anthracene in coordination with the polymer described by Tanaka-Fillmore et al referred to above are shown. The protonated form $BH^+$ of anthracene coordinates well with the Tanaka polymer in which the null point of this polymer (3.8 pH) corresponds with the ground state pKa value of the anthracene.

TABLE 3 pH change and species concentrations
BH+ only absorbing, pH = 3.7, 413.1 nm
BH+ <--> B + H+
Anthracene Jump Molecule

|  | Ground | Singlet | Triplet | Log (eps) | epsilon |
|---|---|---|---|---|---|
| pK's | 3.8 | 13.6 | 10.3 |  |  |
| Lifetimes nS (mS) |  | 10.0 | (10.0) |  |  |
| B | 6.4D-4 | 3.2D-21 | 6.9D-11 | 0.04 | 1 |
| BH+ | 1.8D-4 | 2.3D-11 | 1.8D-4 | 4.38 | 23988 |
| Initial Concentrations: |  | Final pH: |  |  |  |
| pH | 3.7 | 3.9 |  |  |  |
| [H+] | 2.0D-4 | 1.3D-4 |  |  |  |
| [B] | 7.1D-4 |  |  |  |  |
| [BH+] | 2.9D-Watts |  | 6.3 | Photons/sec | 1.4D + 19 |
| Total B | 1.0D-3 V |  | cm3 1.0 | P/cm3-sec | 1.4D + 19 |

413.1 nm = Center Kr+ line: 406.7, 413.1, 415.4

For use with the Tanaka-Fillmore polymer, the desired protonated form of anthracene is derived by dissolving enough anthracene in cyclohexane, as described in Table 3, so that the resulting concentration of non-protonated anthracene is 7.1D-4 moles/liter when the pH is adjusted to 3.7 by the addition of sulfuric acid ($H_2SO_4$). The mixture is then vigorously shaken in a separatory funnel, causing the anthracene to diffuse from the cyclohexane to the sulfuric acid to form a solution of protonated anthracene.

For the polymer-anthracene combination described, a BeamLok 2080 krypton ion laser may be used to irradiate the polymer system at 413.1 nanometers and 6.3 watts. The one cubic centimeter irradiation volume is large enough to house a polymer of macroscopic dimensions as the jump molecule provides a pH change from 3.7 to 3.9. The 10 millisecond prolonged excited state, permits the continuous wave laser to maintain a constant elevated pH level. Once the irradiation is cut-off, the excited-state jump molecules will decay to the ground state and reassociate, causing a return to the original pH in a few milliseconds. As before stated, the heat created by the jump molecules absorbing light will be efficiently discharged as light of a longer wavelength.

Obviously, many modifications and variations of the invention are possible in light of the above teachings. It is therefore to be understood that within the scope of the appended claims the invention may be practiced otherwise than as has been described.

What is claimed is:

1. An apparatus comprising:
a solution containing anthracene in its protonated form; and a source of visible light in which said source of visible light is used to irradiate said solution at a wavelength and of an intensity to establish a pH change in said solution.

2. The apparatus of claim 1 in which said anthracene is phosphorescencible.

* * * * *